(12) United States Patent
Ye

(10) Patent No.: US 9,029,678 B2
(45) Date of Patent: May 12, 2015

(54) DIGITAL PIANO

(71) Applicant: Wanaka Inc., Santa Clara, CA (US)

(72) Inventor: Bin Ye, Santa Clara, CA (US)

(73) Assignee: Wanaka Inc., Santa Clara, CA (US)

( * ) Notice: Subject to any disclaimer, the term of this patent is extended or adjusted under 35 U.S.C. 154(b) by 0 days.

(21) Appl. No.: 14/316,927

(22) Filed: Jun. 27, 2014

(65) Prior Publication Data

US 2015/0000506 A1    Jan. 1, 2015

(30) Foreign Application Priority Data

Jun. 27, 2013  (CN) .................. 2013 2 0374568 U

(51) Int. Cl.
*A63H 5/00* (2006.01)
*G04B 13/00* (2006.01)
*G10H 7/00* (2006.01)
*G09B 15/02* (2006.01)
*G10G 1/02* (2006.01)

(52) U.S. Cl.
CPC ................ *G09B 15/023* (2013.01); *G10G 1/02* (2013.01)

(58) Field of Classification Search
CPC .... G09B 15/003; G09B 15/02; G09B 15/023; G09B 5/06; G10H 1/0016; G10H 2220/061
USPC .................................. 84/609, 478
See application file for complete search history.

(56) References Cited

U.S. PATENT DOCUMENTS

| | | | | |
|---|---|---|---|---|
| 5,214,231 A * | 5/1993 | Ernst et al. ...................... 84/652 |
| 5,394,784 A * | 3/1995 | Pierce et al. ................ 84/464 A |
| 5,521,323 A * | 5/1996 | Paulson et al. .................. 84/610 |
| 6,107,559 A * | 8/2000 | Weinstock et al. ............. 84/634 |
| 6,388,181 B2 * | 5/2002 | Moe ........................... 84/477 R |
| 8,525,011 B2 * | 9/2013 | Ihara .............................. 84/478 |
| 8,598,444 B2 * | 12/2013 | Morrissey et al. .............. 84/743 |
| 8,686,268 B1 * | 4/2014 | Young ......................... 84/470 R |
| 8,697,972 B2 * | 4/2014 | Dripps et al. ............... 84/470 R |
| 2002/0134216 A1 * | 9/2002 | Shibukawa ................ 84/477 R |
| 2012/0144977 A1 * | 6/2012 | Morrissey et al. ............. 84/602 |

* cited by examiner

*Primary Examiner* — Jeffrey Donels
(74) *Attorney, Agent, or Firm* — Lerner, David, Littenberg, Krumholz & Mentlik, LLP

(57) ABSTRACT

A digital piano includes a keyboard comprising a plurality of keys; LED prompting lights corresponding to and disposed on the keys; a mode selector for making the digital piano at least work in a LED rectifying mode; a sound engine configured to receive an input note information relative to a key pressed and convert the input note information into a first note data; a digital music sheet processor configured to receive the first note data in real time from the sound engine, to compare an input note corresponding to the first note data with the note of a preset music sheet based on the preset music sheet and the first note data when the mode selector selects the LED rectifying mode and to determine whether to continue to play; at least one speaker configured to send out a sound according to a sound signal corresponding to the first note data.

14 Claims, 3 Drawing Sheets

DIGITAL PIANO

CROSS REFERENCE TO RELATED APPLICATION

This application claims priority from Chinese Patent Application No. 201320374568.0, filed with State Intellectual Property Office, P. R. C. on Jun. 27, 2013, the entire content of which is incorporated herein by reference.

FIELD

The present disclosure generally relates to the field of digital music compounding, and more particularly to a digital piano with a function of improving the piano playing ability of a player especially a tyro.

BACKGROUND

A digital piano is a musical instrument configured to replace a piano in some occasions, which emerged in 1960s and 1970s and was popular from 1980s to 1990s. The principle of the digital piano is that a keyboard acts as an on-off switch, once a key is pushed down, the internal crystal oscillator will begin to work for producing a wave with certain frequency, the wave is amplified by a frequency divider, and the amplified wave is sent to a speaker to send out a sound.

Generally, the digital piano is provided with the programs for controlling voices, rhythms and obbligatos. The voice selector of the conventional digital piano is disposed on the main keyboard thereof, and each voice corresponds to one key. When a user presses a key down, i.e. selects a corresponding voice, the digital piano calls the voice data base of the program according to the selection of the user to output the corresponding voice, so as to play the desired music composition.

The digital piano has a better competitiveness than the conventional piano in terms of the price. FIG. 1 is a schematic perspective view of a conventional digital piano 100'. For the digital piano 100', a tyro generally needs to put a music sheet on a music stand 1', and plays through a main keyboard 2' according to the music sheet. As there are many keys on the digital piano and the piano music study is complex, the tyro generally needs a long time to be acquainted with and deftly use the digital piano.

Additionally, for the conventional digital piano, a plurality of music sheets can be pre-stored in the main keyboard, however, the player or the pianist is not able to reset or update the music sheets, which is inconvenient for the player or the pianist. Furthermore, for the conventional digital piano, the player must turn the music book page by page, and when playing a wrong note, the player should stop to mark for the repeated exercise, which causes a huge waste of the effective practice time.

Therefore, it is necessary to provide a digital piano, which is configured for the tyro to learn the piano fingering and playing skills quickly.

SUMMARY

Embodiments of the present disclosure seek to solve at least one of the problems existing in the prior art to at least some extent.

Accordingly, a digital piano is provided, which can grasp the playing condition of a tyro rapidly, and improve the learning efficiency of a piano learner, especially the tyro.

According to an aspect of the present disclosure, a digital piano is provided. The digital piano comprises: a keyboard, comprising a plurality of keys; a plurality of LED prompting lights corresponding to and disposed on the plurality of keys respectively; a mode selector connected with the keyboard so as to make the digital piano at least work in a LED rectifying mode; a sound engine connected with the keyboard and configured to receive an input note information relative to a key pressed and to convert the input note information into a first note data; a digital music sheet processor connected respectively with the sound engine and the mode selector, configured to receive the first note data in real time from the sound engine, to compare an input note corresponding to the first note data with the note of a preset music sheet based on the preset music sheet and the first note data when the mode selector selects the LED rectifying mode and to determine whether to continue to play; and at least one speaker, configured to send out a sound according to a sound signal corresponding to the first note data.

The digital piano according to an embodiment of the present disclosure can communicate with the player via the digital music sheet processor, and consequently it is possible to grasp the playing condition and playing result to rectify the played note in time, thus learning the piano and being acquainted with the music sheet quickly.

In one embodiment, when the mode selector selects the LED rectifying mode, if a current note of the preset music sheet is not corresponding with the input note, the LED prompting light on the key corresponding to the current note is turned on and the digital music sheet processor stops at the current note; and if the current note of the preset music sheet is corresponding with the input note, the LED prompting light remains turned off, and the digital music sheet processor works on a next note.

In one embodiment, the digital music sheet processor comprises: a music sheet player playing the preset music sheet; a memory connected with the music sheet player and configured to store the preset music sheet; a display connected with the music sheet player and configured to display the preset music sheet and the input note corresponding to the first note data; and a comparator connected with the music sheet player and configured to compare the input note with the note of the preset music sheet.

In one embodiment, the music sheet player is configured to adjust a playing speed of the music sheet, to fast forward, to fast reverse, to pause, to step forward or to stop the music sheet.

In one embodiment, when the comparator determines the preset note of the preset music sheet is not corresponding with the input note, the display displays a message indicating the preset note of the preset music sheet is not corresponding with the input note.

In one embodiment, the digital piano further comprises: a note adder and an audio amplifier, wherein the note adder is connected with the digital music sheet processor, the audio amplifier and the sound engine respectively and the audio amplifier is connected between the at least one speaker and the note adder, the sound engine comprises a first sound output unit configured to output a first sound signal corresponding to the first note data, and the digital music sheet processor comprises a second sound output unit configured to output a second sound signal corresponding to a second note data, in which the note adder is configured to add the first sound signal from the first sound output unit to the second sound signal from the second sound output unit to get an added signal and to output the added signal to the at least one speaker.

In one embodiment, the digital piano further comprises: an electrical slot configured to electrically connect with the digital music sheet processor.

In one embodiment, the digital music sheet processor electrically connects with the note adder via a parallel port or a serial port.

In one embodiment, the digital piano further comprises: a foot pedal electrically connected with the digital music sheet processor, wherein the digital music sheet processor converts an information produced when the foot pedal is pressed down into a second note data.

In one embodiment, the note data is in a MIDI format.

In one embodiment, the digital music sheet processor downloads piano music sheets through Internet.

In one embodiment, the digital music sheet processor is any one of an iPad, an iPhone and a handheld computer device.

In one embodiment, the mode selector is further configured to control the digital piano to work in an LED playing mode or an LED step-forward-prompting mode.

In one embodiment, when the mode selector selects the LED playing mode, the LED prompting light on the key corresponding to the current note data of the preset music sheet is turned on.

In one embodiment, when the mode selector selects the LED step-forward-prompting mode and the first note data is not corresponding with the current note data, the LED prompting light on the key corresponding to the current note data of the preset music sheet is turned on until a next adjacent note of the current note of the preset music sheet is played.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
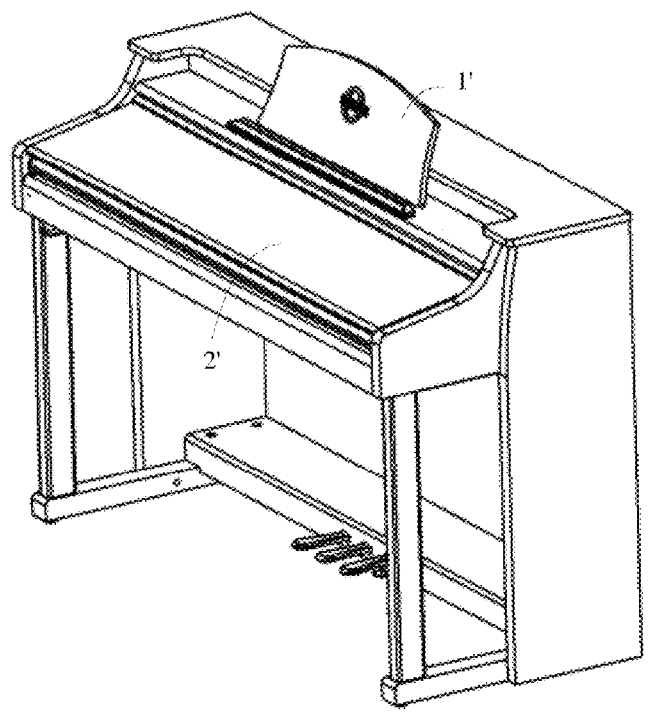
FIG. 1 is a schematic perspective view of a conventional digital piano.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

It should be understood that any procedure or method described in the flow charts or described in any other way herein may be understood to comprise one or more modules, portions or parts for storing executable codes that realize particular logic functions or procedures. Moreover, preferred embodiments of the present disclosure comprise other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

Figure 2:
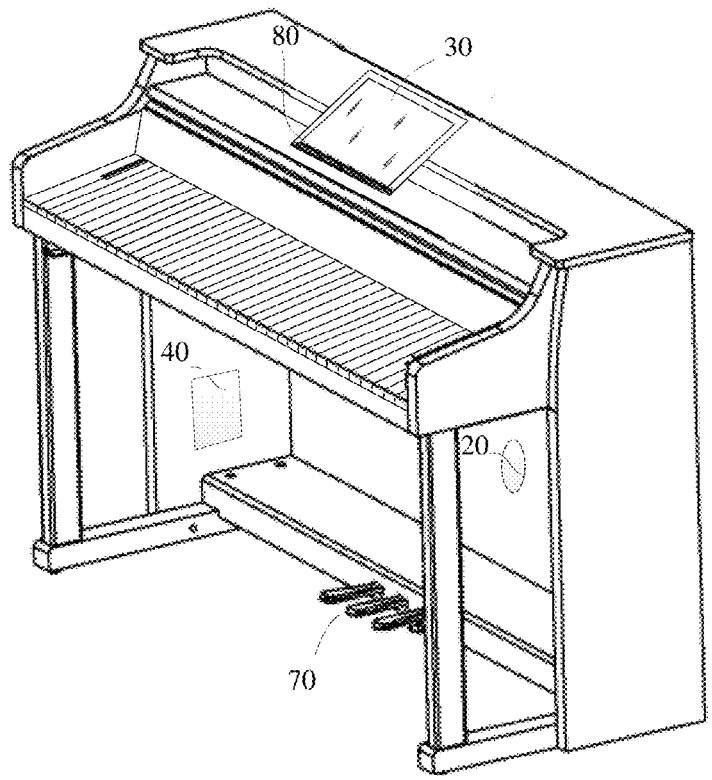
FIG. 2 is a schematic perspective view of a digital piano according to an embodiment of the present disclosure.
Figure 3:
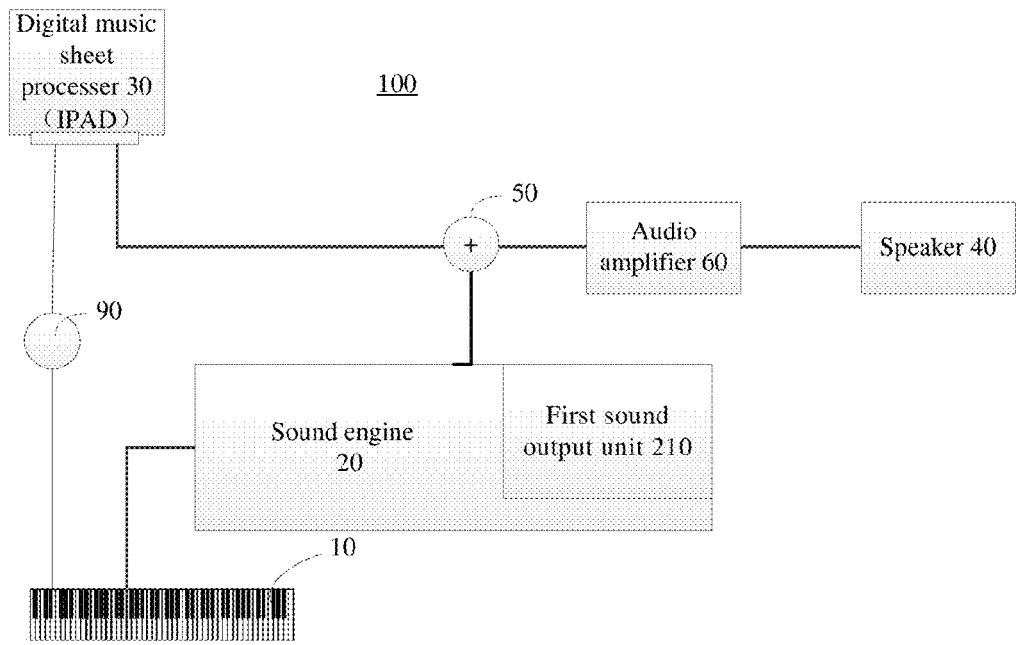
FIG. 3 is a schematic diagram of a digital piano according to an embodiment of the present disclosure.

The digital piano 100 according to an embodiment of the present disclosure will be described in detail with the reference to the drawings. FIG. 2 is a schematic perspective view of the digital piano according to an embodiment of the present disclosure, and FIG. 3 is a schematic diagram of the digital piano 100 according to an embodiment of the present disclosure.

Figure 5:
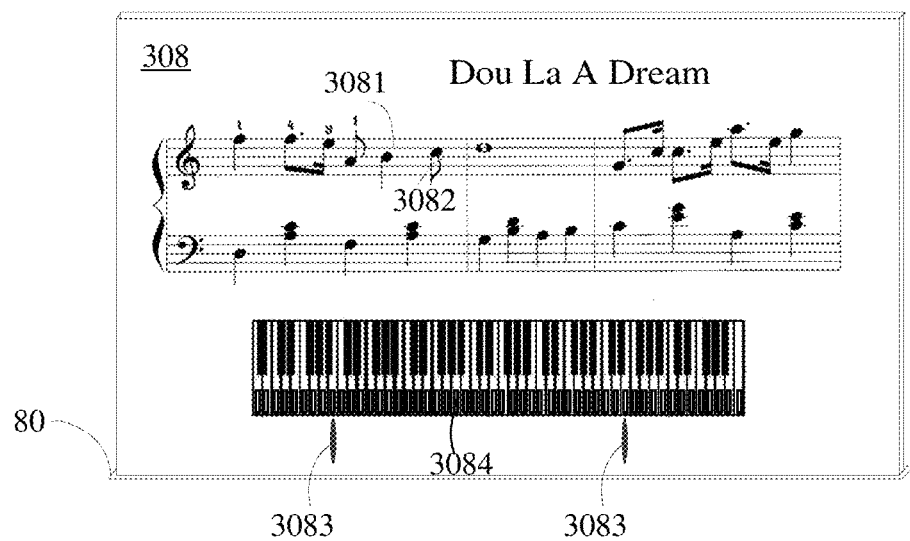
FIG. 5 is a schematic plan view of a display of a music sheet processor according to an embodiment of the present disclosure.

As shown in FIG. 2, the digital piano 100 comprises: a keyboard 10, a sound engine 20, a digital music sheet processor 30, at least one speaker 40 and a mode selector 80. The keyboard 10 comprises a plurality of keys, as shown in FIG. 2, and the a plurality of keys of the keyboard 10 are provided with a plurality of corresponding LED prompting lights 3084 respectively, as shown in FIG. 5. In one embodiment, the LED prompting light 3084 is mounted on the top surface of the key. The mode selector 80 is configured to make the digital piano 100 at least work in a LED rectifying mode. Alternatively, the mode selector 80 is further configured to control the digital piano 100 to work in an LED playing mode or an LED step-forward-prompting mode. The mode selector 80 can be set by software or hardware. Alternatively, the mode selector 80 is configured as a multipole switch, so as to select the mode of the digital piano 100. The sound engine 20 is connected with the keyboard 10, and configured to receive the input note information relative to the key pressed and to convert the input note information into a first note data. The digital music sheet processor 30 is connected respectively with the sound engine 20 and the mode selector 80, and configured to receive the first note data in real time from the sound engine 20, to compare an input note corresponding to the first note data with the note of a preset music sheet based on the preset music sheet and the first note data when the mode selector 80 selects the LED rectifying mode and to determine whether to continue to play. In one embodiment, when the mode selector 80 selects the LED rectifying mode, if a current note of the preset music sheet is not corresponding with the input note, the LED prompting light 3084 on the key corresponding to the current note is turned on and the digital music sheet processor 30 stops at the current note. If it is determined by a device such as the comparator 306 which will be described in detail in the following that the current note of the preset music sheet is corresponding with the input note, the LED prompting light 3084 on the key corresponding to the current note remains turned off, and the digital music sheet processor 30 works on the next note. The speaker 40 is configured to send out a sound according to a sound signal corresponding to the first note data. The digital piano 100 may be provided with a plurality of the speakers 40, for example, the digital piano 100 may be provided with a left speaker and a right speaker (not shown), so as to enhance the voice effect.

Therefore, the digital piano 100 according to an embodiment of the present disclosure can communicate with the player via the digital music sheet processor 30, and consequently it is possible to grasp the playing condition and playing result to rectify the played note in time, thus learning the piano and being acquainted with the music sheet quickly. In other words, it is possible to determine whether to continue to play by comparing the note corresponding to the first note data input by the player with the note of the preset music sheet using the digital music sheet processor 30, so as to rectify the played note in time.

Figure 4:
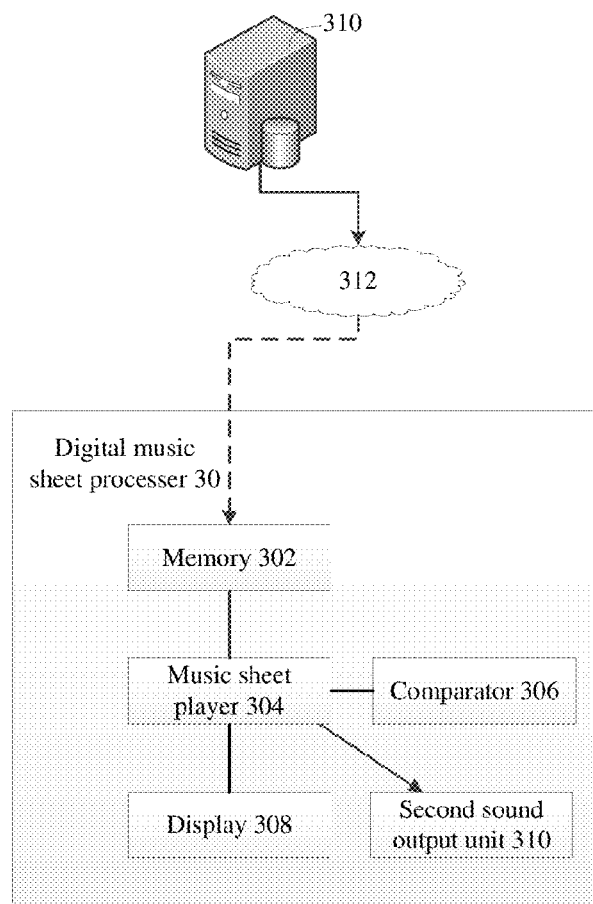
FIG. 4 is a schematic diagram of a music sheet processor of a digital piano according to an embodiment of the present disclosure.

The digital music sheet processor 30 according to an embodiment of the present disclosure will be described in detail with the reference to FIG. 4. As shown in FIG. 4, the digital music sheet processor 30 comprises a memory 302, a music sheet player 304, a comparator 306, and a display 308. The music sheet player 304 is configured to play the preset music sheet to function as a conventional music stand, which is convenient for the player to play a musical composition. The memory 302 is connected with the music sheet player 304 and configured to store the preset music sheet. The music sheet can be pre-stored in the memory, and be downloaded from the network data base 310 or the Internet 312. The display 308 is connected with the music sheet player 304 and configured to display the preset music sheet and the input note corresponding to the first note data. The comparator 306 is connected with the music sheet player 304 and configured to compare the input note with the note of the preset music sheet when the digital piano 100 is in the LED rectifying mode.

In one embodiment, as shown in FIG. 5, the keys are respectively provided with the LED prompting lights 3084. As mentioned above, when the digital piano 100 is in the LED rectifying mode and it is determined by the comparator 306 that the current note of the preset music sheet is not corresponding with the input note, the LED prompting light 3084 on the key corresponding to the current note is turned on. Thus, it is possible to prompt the player to press a corresponding right key, which is further convenient for the player. When the digital piano 100 is in the LED rectifying mode and it is determined by the comparator 306 that the current note of the preset music sheet is corresponding with the input note, the LED prompting light 3084 remains turned off. The LED prompting light 3084 on each key may be controlled by the digital music sheet processor 30, and may also be controlled via the sound engine 20. Alternatively, after the separate controller (not shown) disposed in the digital piano 100 receives the current note from the digital music sheet processor 30 and the input note, the LED prompting light 3084 can be controlled by the controller.

The process will be further described in detail with reference to FIG. 5. As shown in FIG. 5, the display 308 displays the note 3081 of the playing music sheet "Duo La A dream". When the player presses the right key, the music sheet player 304 will play or work on the next note 3082. If the player presses a wrong key, the digital music sheet processor 30 will generate a prompt that the player presses the wrong key, and the music sheet displayer 304 stops at the note 3081. Alternatively, the display 308 displays the corresponding right key 3083 to prompt the player to input the right key, i.e. the display 308 displays the key message corresponding to the current note when it is determined by the comparator 306 that the current note of the preset music sheet is not corresponding with the input note.

In one embodiment, the music sheet player 304 is configured to adjust the playing speed of the music sheet, to fast forward, to fast reverse, to pause, to step forward or to stop the music sheet, thus providing the user with various trainings.

In one embodiment, as shown in FIG. 3, the digital piano 100 further comprises a note adder 50 and an audio amplifier 60. The note adder 50 is connected with the digital music sheet processor 30, the audio amplifier 60 and the sound engine 20 respectively and the audio amplifier 60 is connected between the at least one speaker 40 and the note adder 50. Thus, it is possible to control the level of the sound by the audio amplifier 60. The sound engine 20 comprises a first sound output unit 210 configured to output a first sound signal corresponding to the first note data, the digital music sheet processor 30 comprises a second sound output unit 310 configured to output a second sound signal from the music sheet player 304, in which the note adder 50 is configured to add the first sound signal from the first sound output unit 210 to the second sound signal from the second sound output unit 310 to get an added signal and to output the added signal to the at least one speaker 40, so as to add the obbligatos or voices.

In one embodiment, the digital piano 100 may further comprise an electrical slot 90, as shown in FIG. 3. The electrical slot 90 may be configured to electrically connect with the digital music sheet processor 30. The digital music sheet processor 30 electrically connects with the note adder 50 via a parallel port or a serial port.

In one embodiment, as shown in FIG. 2, the digital piano 100 may further comprise: a foot pedal 70 electrically connected with the digital music sheet processor 30, in which the digital music sheet processor 30 converts an information produced when the foot pedal 70 is pressed down into a second note data, thus achieving various ways to control the playing effect.

In the above embodiments, the note data is in MIDI format. However, it should be noted that, it would be appreciated by those skilled in art that the note data may be in any other format. As described above, the digital music sheet processor 30 can be configured to download the piano music sheets through Internet 312, so that it is convenient to replace the music sheets and overcome the defect that for the conventional digital piano the format of the preset music is difficult to replace or the number of the music sheets is too small.

It should be noted that the above digital music sheet processor 30 may be any one of an iPad, an iPhone from the APPLE and a handheld computer device (such as a mobile phone, a PDA, a Notebook, etc.), which is electrically connected with the sound engine 20, thus controlling the playing progress and rhythm.

In one embodiment, as shown in FIG. 3, the mode selector 80 may be further configured to control the digital piano 100 to work in an LED playing mode or an LED step-forward-prompting mode. Specifically, when the mode selector 80 selects the LED playing mode, the LED prompting light 3084 on the key corresponding to the current note data of the preset music sheet is turned on, so that the tyro can imitate the playing method and practice the fingering.

Alternatively, when the mode selector 80 selects the LED step-forward-prompting mode and the first note data is not corresponding with the current note data, the LED prompting light 3084 on the key corresponding to the current note data of the preset music sheet is turned on until a next adjacent note of the current note of the preset music sheet is played. Thus, only the LED prompting light corresponding to the note which is played wrongly will be display so as to prompt the user, but the subsequent playing and practice are not influenced.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

What is claimed is:

1. A digital piano, comprising:
   a keyboard, comprising a plurality of keys;
   a plurality of LED prompting lights corresponding to and disposed on the plurality of keys respectively;
   a mode selector connected with the keyboard so as to make the digital piano at least work in a LED rectifying mode;
   a sound engine connected with the keyboard and configured to receive an input note information relative to a key pressed and to convert the input note information into a first note data;
   a digital music sheet processor connected respectively with the sound engine and the mode selector, configured to receive the first note data in real time from the sound engine, to compare an input note corresponding to the first note data with the note of a preset music sheet based on the preset music sheet and the first note data when the mode selector selects the LED rectifying mode and to determine whether to continue to play; and
   at least one speaker, configured to send out a sound according to a sound signal corresponding to the first note data,
   wherein when the mode selector selects the LED rectifying mode,
   if a current note of the preset music sheet is not corresponding with the input note, the LED prompting light on the key corresponding to the current note is turned on and the digital music sheet processor stops at the current note; and
   if the current note of the preset music sheet is corresponding with the input note, the LED prompting light remains turned off, and the digital music sheet processor works on a next note.

2. The digital piano according to claim 1, wherein the digital music sheet processor comprises:
   a music sheet player playing the preset music sheet;
   a memory connected with the music sheet player and configured to store the preset music sheet;
   a display connected with the music sheet player and configured to display the preset music sheet and the input note corresponding to the first note data; and a comparator connected with the music sheet player and configured to compare the input note with the note of the preset music sheet.

3. The digital piano according to claim 2, wherein the music sheet player is configured to adjust a playing speed of the music sheet, to fast forward, to fast reverse, to pause, to step forward or to stop the music sheet.

4. The digital piano according to claim 2, wherein when the comparator determines the preset note of the preset music sheet is not corresponding with the input note, the display displays a message indicating the preset note of the preset music sheet is not corresponding with the input note.

5. The digital piano according to claim 1, further comprising: a note adder and an audio amplifier, wherein the note adder is connected with the digital music sheet processor, the audio amplifier and the sound engine respectively and the audio amplifier is connected between the at least one speaker and the note adder, the sound engine comprises a first sound output unit configured to output a first sound signal corresponding to the first note data, and the digital music sheet processor comprises a second sound output unit configured to output a second sound signal corresponding to a second note data, in which
the note adder is configured to add the first sound signal from the first sound output unit to the second sound signal from the second sound output unit to get an added signal and to output the added signal to the at least one speaker.

6. The digital piano according to claim 5, further comprising:
an electrical slot configured to electrically connect with the digital music sheet processor.

7. The digital piano according to claim 5, wherein the digital music sheet processor electrically connects with the note adder via a parallel port or a serial port.

8. The digital piano according to claim 1, further comprising:
a foot pedal electrically connected with the digital music sheet processor, wherein the digital music sheet processor converts an information produced when the foot pedal is pressed down into a second note data.

9. The digital piano according to claim 1, wherein the note data is in a MIDI format.

10. The digital piano according to claim 1, wherein the digital music sheet processor downloads piano music sheets through Internet.

11. The digital piano according to claim 1, wherein the digital music sheet processor is any one of an iPad, an iPhone and a handheld computer device.

12. The digital piano according to claim 1, wherein the mode selector is further configured to control the digital piano to work in an LED playing mode or an LED step-forward-prompting mode.

13. The digital piano according to claim 12, wherein when the mode selector selects the LED playing mode, the LED prompting light on the key corresponding to the current note data of the preset music sheet is turned on.

14. The digital piano according to claim 12, wherein when the mode selector selects the LED step-forward-prompting mode and the first note data is not corresponding with the current note data, the LED prompting light on the key corresponding to the current note data of the preset music sheet is turned on until a next adjacent note of the current note of the preset music sheet is played.

* * * * *